(12) United States Patent
Schulz et al.

(10) Patent No.: US 8,536,818 B2
(45) Date of Patent: Sep. 17, 2013

(54) CONTROL OF A TRACTION POWER INVERTER MODULE IN A VEHICLE HAVING AN ELECTRIC TRACTION MOTOR

(75) Inventors: Steven E. Schulz, Torrance, CA (US); Mohammad N. Anwar, Van Buren Township, MI (US); Michael J. Grimmer, Troy, MI (US); Silva Hiti, Redondo Beach, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 212 days.

(21) Appl. No.: 13/086,532

(22) Filed: Apr. 14, 2011

(65) Prior Publication Data

US 2012/0112674 A1    May 10, 2012

Related U.S. Application Data

(60) Provisional application No. 61/410,089, filed on Nov. 4, 2010.

(51) Int. Cl.
 *G05B 11/28* (2006.01)
(52) U.S. Cl.
 USPC ............................................ 318/599; 318/811

(58) Field of Classification Search
 USPC .................... 318/599, 811, 139; 363/40, 41, 363/131, 132
 See application file for complete search history.

(56) References Cited

U.S. PATENT DOCUMENTS

| | | | | |
|---|---|---|---|---|
| 6,023,417 A | * | 2/2000 | Hava et al. | 363/41 |
| 7,190,143 B2 | * | 3/2007 | Wei et al. | 318/606 |
| 7,411,801 B2 | * | 8/2008 | Welchko et al. | 363/131 |
| 7,616,466 B2 | * | 11/2009 | Chakrabarti et al. | 363/132 |
| 7,679,310 B2 | | 3/2010 | Schultz et al. | |

* cited by examiner

*Primary Examiner* — Rina Duda
(74) *Attorney, Agent, or Firm* — Quinn Law Group, PLLC

(57) ABSTRACT

A method for controlling a traction power inverter module (TPIM) in a vehicle includes determining a commanded output torque of the motor using a controller. The method further includes controlling the TPIM and motor using a discontinuous pulse width modulated (DPWM) signal when the commanded output torque is less than a calibrated torque threshold. A continuous pulse width modulated (CPWM) signal is used when the commanded output torque is greater than the threshold. The method may include determining a direction of a change in the commanded output torque, and controlling the TPIM, via the controller, using the DPWM signal only when the commanded output torque drops below a predetermined hysteresis level. A vehicle includes a traction motor producing a motor torque for propelling the vehicle, an ESS, a TPIM, and a controller configured as noted above.

13 Claims, 1 Drawing Sheet

CONTROL OF A TRACTION POWER INVERTER MODULE IN A VEHICLE HAVING AN ELECTRIC TRACTION MOTOR

CROSS-REFERENCE TO RELATED APPLICATIONS

This application claims the benefit of U.S. Provisional Patent Application No. 61/410,089, filed Nov. 4, 2010, which is hereby incorporated by reference in its entirety.

TECHNICAL FIELD

The present disclosure relates to the control of a traction power inverter module of the type used aboard a vehicle.

BACKGROUND

Certain vehicles can operate in one or more electric vehicle (EV) modes. In an EV mode, a high-voltage electric traction motor can be used as a prime mover. For example, an extended range electric vehicle (EREV) can be propelled by a fraction motor over a limited distance solely using battery power. Beyond a threshold range, a small internal combustion engine powers a generator to extend the effective EV range. A battery electric vehicle (BEV) operates exclusively in an EV mode, while a hybrid electric vehicle (HEV) selectively uses either or both of an internal combustion engine and a fraction motor(s) during different operating modes.

An electric drive system of the type used for establishing an EV mode typically includes a traction power inverter module (TPIM). The traction motors used for propelling the vehicle in an EV mode are typically configured as multi-phase AC induction or permanent magnet machines, while the battery module from which the traction motor draws electrical power is a high-voltage DC storage device. Reliable AC-to-DC and DC-to-AC power conversion is thus necessary. Various semiconductor switches or solid state devices within the TPIM are controlled to achieve the required power conversion. However, conventional control methods may be less than optimal under certain vehicle operating conditions and loads.

SUMMARY

Accordingly, a method is disclosed for controlling an electric traction motor of a vehicle using a controller and a traction power inverter module (TPIM). The controller selects and transmits a selected pulse width modulation (PWM) signal to the TPIM. The selected PWM signal as used herein is one of a continuous pulse width modulation (CPWM) signal and a discontinuous pulse width modulation (DPWM) signal.

In one embodiment, selection of the PWM signal depends on a commanded output torque of the traction motor. The controller may automatically select the CPWM signal when the commanded output torque exceeds a calibrated threshold. Likewise, the DPWM signal may be selected when the commanded output torque is less than the calibrated threshold. A hysteresis band may be established with respect to the calibrated threshold in order to modify the calibrated threshold, e.g., based on the direction of a change in the commanded output torque, as will be explained in detail below.

In particular, a method is disclosed for controlling a traction power inverter module (TPIM) in a vehicle having the TPIM and a traction motor. The method includes comparing a commanded output torque of the traction motor to a calibrated threshold using a controller. The method further includes automatically selecting a discontinuous pulse width modulated (DPWM) signal when the commanded output torque is less than the calibrated threshold, and automatically selecting a continuous pulse width modulated (CPWM) signal when the commanded output torque is greater than the calibrated threshold. The selected signal is transmitted from the TPIM to the traction motor to thereby control an operation of the fraction motor.

A vehicle is also disclosed which includes a fraction motor, an energy storage system (ESS), a TPIM, and a controller. The controller determines a commanded output torque of the traction motor, and controls the TPIM and the traction motor using a selected PWM signal. A DPWM signal is selected when the commanded output torque is less than a calibrated torque threshold, and a CPWM signal is selected when the commanded output torque is greater than the calibrated torque threshold.

The above features and advantages and other features and advantages of the present invention are readily apparent from the following detailed description of the best modes for carrying out the invention when taken in connection with the accompanying drawings.

DESCRIPTION

Figure 1:
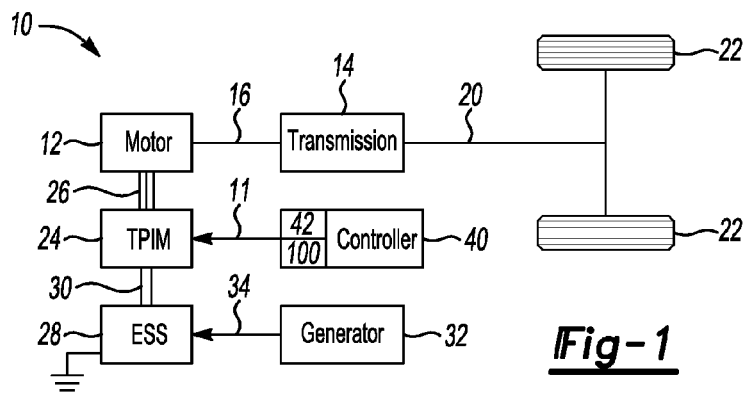
FIG. 1 is a schematic illustration of a vehicle having a traction power inverter module (TPIM) and a controller as disclosed herein.

Referring to the drawings, wherein like reference numbers correspond to like or similar components throughout the several figures, and beginning with FIG. 1, a vehicle 10 includes a controller 40. The controller 40 is configured to execute a method 100, which may be embodied as a set of process instructions recorded on a tangible/non-transitory memory device 42.

Using the present method 100, the controller 40 automatically selects between a continuous pulse width modulation (CPWM) signal and a discontinuous pulse width modulation (DPWM) signal depending on the commanded output torque of an electric traction motor 12. The selected signal is then used to control a traction power inverter module (TPIM) 24, i.e., a DC-to-AC and AC-to-DC power inverter, such as the example described below with reference to FIG. 2. While one traction motor 12 is shown in FIG. 1 for simplicity, other vehicle embodiments may include a plurality of such fraction motors, with the control of each being as set forth below.

As applied in the field of electric motor control, PWM techniques deliver pulsed energy to a target system, e.g., the TPIM 24 of FIG. 1, via a rectangular pulse wave. The pulse wave has a pulse width that is automatically modulated by a controller, e.g., the present controller 40, thus resulting in a particular variation of an average value of the pulse waveform. By modulating the pulse width using the controller 40, energy flow is precisely regulated to the fraction motor 12 through the TPIM 24. By switching voltage to the TPIM 24 or other load with an appropriate duty cycle, the output approximates a desired output voltage. Therefore, PWM techniques can be used as an efficient means of motor control aboard the vehicle 10.

In particular, the controller 40 shown in FIG. 1 is configured to determine the presently commanded motor output torque of the traction motor 12, and to automatically select between a CPWM and a DPWM mode via PWM signal (arrow 11) depending on the motor output torque. Other commands, such as a commanded motor speed, may be used, either alone or in conjunction with the commanded motor torque.

In a DPWM signal switching does not occur near the peaks of a sinusoidal phase current signal. In a CPWM signal, e.g., a Space Vector PWM signal or another suitable CPWM signal, switching occurs continuously, including at the peaks of the sinusoidal phase current signal. The two PWM modes therefore have relative advantages and drawbacks.

Therefore, at high duty cycles, e.g., at light-to-medium electrical loads, the controller 40 automatically selects the DPWM mode. This provides lower switching losses and increases system efficiency. At such light-to-medium electrical loads, motor-induced noise, vibration, and harshness (NVH) is typically minimal. At higher loads/lower duty cycles, the controller 40 automatically selects the CPWM mode to optimize driveline NVH performance. Efficiency is thus sacrificed to some extent at lower duty cycles in order to reduce NVH where it would otherwise be the most noticeable to a driver of the vehicle 10. However, the overall drive cycle impact is expected to be minimal due to the low duty cycle.

Still referring to FIG. 1, the vehicle 10 may be configured in the embodiment shown in FIG. 1 as an extended-range electric vehicle (EREV). Other possible embodiments include a battery electric vehicle (BEV) and a hybrid electric vehicle (HEV). Regardless of the embodiment, the vehicle 10 includes at least one traction motor 12, which can be used to propel the vehicle in an electric-only (EV) operating mode. Each traction motor 12 powers a motor output shaft 16, which is connected to an input member (not shown) of a transmission 14. The transmission 14 may include as many gear sets, clutches, brakes, and interconnecting members as are needed to produce a desired set of speed ratios. An output member 20 of the transmission 14 ultimately powers a set of drive wheels 22.

The traction motor 12 may be configured as a multi-phase AC induction or permanent magnet electric machine, and rated for approximately 60 VAC to 300 VAC depending on the design. The TPIM 24 is electrically connected to the traction motor 12 using a high-voltage AC bus 26, e.g., a conductive bus bar, interconnect member, or cable. The TPIM 24 converts DC power to AC power and vice versa as needed using a plurality of semiconductor switches 50 (see FIG. 2), for example an insulated gate bipolar transistor (IGBT) or a field-effect transistor (FET), e.g., a metal oxide semiconductor FET (MOSFET), in order to provide the required power flow aboard the vehicle 10. The TPIM 24 is electrically connected to an energy storage system (ESS) 28, such as a multi-cell rechargeable battery module, using a high-voltage DC bus 30. The traction motor 12 therefore is able to alternately supply and draw power to and from the ESS 28 as needed depending on the current powertrain operating mode.

When the vehicle 10 is configured as an EREV, the ESS 28 may be selectively energized by an electric generator 32. When the generator 32 is operating, electrical energy (arrow 34) is supplied to the ESS 28 and/or directly to the traction motor 12 to extend the effective EV operating range of the vehicle 10. The generator 32 may be selectively turned on and off as needed by the controller 40, or by other suitable control module such as a transmission control processor depending on the state of charge of the ESS 28.

The controller 40 may be configured as a motor control processor, a hybrid/transmission control processor, and/or other digital computer having a microprocessor or central processing unit, read only memory (ROM), random access memory (RAM), electrically-erasable programmable read only memory (EEPROM), a high speed clock, analog-to-digital (A/D) and digital-to-analog (D/A) circuitry, and input/output circuitry and devices (I/O), as well as appropriate signal conditioning and buffer circuitry. Any algorithms resident in the controller 40 or accessible thereby, including any instruction required for executing the present method 100 as described below with reference to FIG. 4, may be stored in non-transitory/tangible memory 42, e.g., flash memory, a magnetic disc, an optical disc, etc., and automatically executed by the controller 40 to provide the respective functionality.

Figure 2:
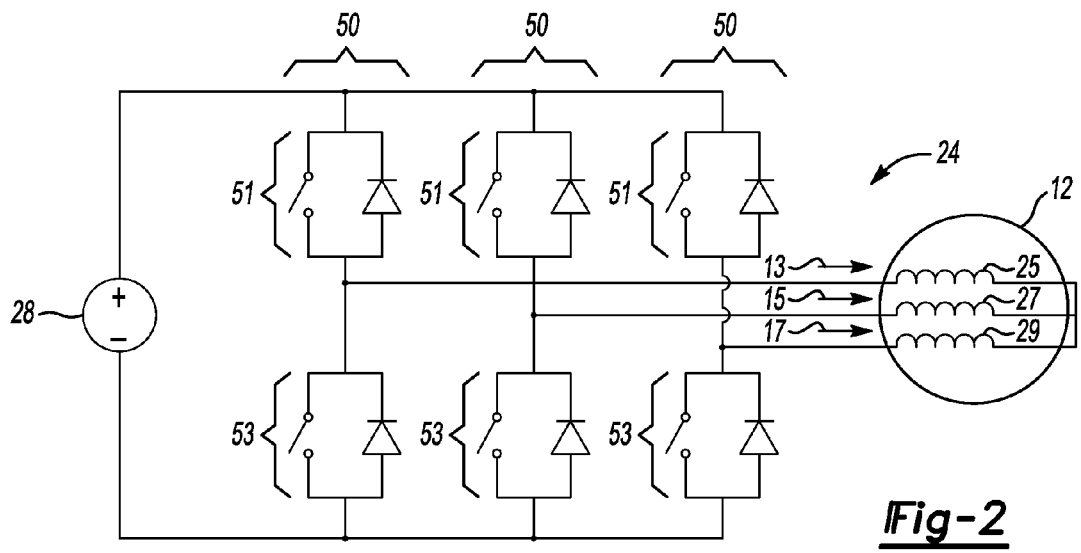
FIG. 2 is a schematic illustration of a TPIM which is usable with the example vehicle shown in FIG. 1.

Referring to FIG. 2, the TPIM 24 is in communication with the controller 40 of FIG. 1. The TPIM 24 may include a network of semiconductor switches 50 having a first input coupled to a voltage source, e.g., the ESS 28, and an output coupled to the traction motor 12. Although a single voltage source is shown, a distributed DC link with two series sources may also be used. Three pairs of series semiconductor switches 50 correspond to the three current phases of the traction motor 12. Phase currents (arrows 13, 15, and 17) are thus delivered from the TPIM 24 to various phase windings 25, 27, and 29 of the traction motor 12.

Each of the pairs of semiconductor switches 50 of FIG. 2 comprises a first semiconductor switch 51 and a second semiconductor switch 53. Each switch 51 is electrically connected to a positive electrode of the ESS 28. Each second switch 53 is electrically connected to a negative electrode of the ESS 28, and to the respective first switch for that particular switch pair.

During operation, torque from the traction motor 12 is delivered to the drive wheels 22 of FIG. 1. In order to power the traction motor 12, DC power is provided from the ESS 28 to the TPIM 24, which converts the DC power into suitable AC power. The conversion of DC power to AC power occurs within the TPIM 24, and is performed by repeatedly switching the semiconductor switches 50 within the TPIM using the controller 40 of FIG. 1.

Generally, the controller 40 of FIG. 1 produces the PWM signals (arrow 11) for controlling the switching action of the TPIM 24. The TPIM 24 then converts the PWM signals to a modulated voltage waveform suitable for operating the traction motor 12. In a typical application with a three-phase AC current motor, three separate PWM signals are generated, one each for a respective pair of the semiconductor switches 50 shown in FIG. 2.

A variety of different types of DPWM and CPWM techniques can be used in the various embodiments. In general, CPWM is defined as a PWM technique where each phase leg of the TPIM 24 is switching continuously over the full 360° cycle of the modulated voltage waveform. Some non-limiting examples of suitable CPWM techniques include sine PWM, third harmonic injection PWM, and classical space vector PWM. Likewise, DPWM is defined herein as a PWM technique where each phase leg of the TPIM 24 is not switched over the full 360° cycle of the modulated waveform. For example, each phase leg of the TPIM 24 cannot be switched for four 30°, two 60°, or one 120° segment of the 360° cycle of the modulated voltage waveform. Some examples of suitable DPWM techniques include, but are not limited to, generalized DPWM (GDPWM), DPWM0, DPWM1, DPWM2, DPWM3, DPWMMIN, and DPWMMAX, as these terms are well understood in the art.

Figure 3:
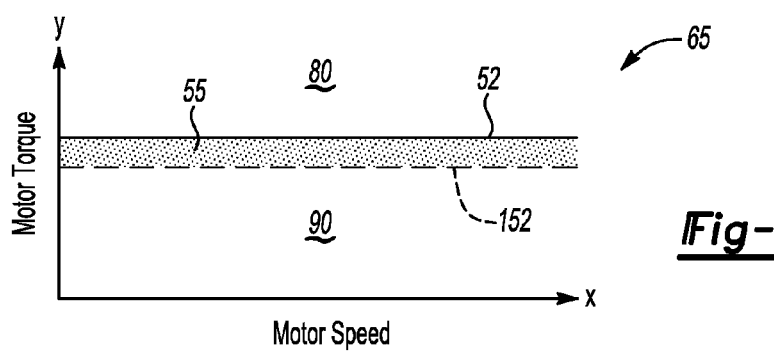
FIG. 3 is a torque versus speed plot describing commanded output torque of a traction motor 12 on the vertical axis and motor output speed on the horizontal axis.

Referring to FIG. 3, a torque/speed chart 65 plots commanded output torque of the traction motor 12 shown in FIG. 1 on the vertical Y axis and motor output speed on the horizontal X axis. The controller 40 of FIG. 1 references a calibrated torque threshold (line 52). Above the calibrated torque threshold (line 52), i.e., shaded area 80, the controller 40 automatically selects the CPWM mode to control the TPIM 24. Below the calibrated torque threshold (line 52), i.e., area 90, the controller 40 automatically selects the DPWM mode to control the TPIM 24.

The controller 40 may also apply a hysteresis band or zone 55. The hysteresis zone 55 is defined by the calibrated torque threshold (line 52) and a calibrated hysteresis line 152. When motor output torque is rising rapidly, the controller 40 may transition to CPWM when the commanded torque exceeds the torque threshold (line 52). However, when motor output torque is decreasing from above the torque threshold (line 52), the controller 40 may instead use the hysteresis line 152 as the level at which DPWM is selected. In one possible embodiment, the hysteresis line 152 may be set at approximately 90% of the level of the torque threshold (line 52), e.g., a torque threshold of 200 Nm and a hysteresis level of 180 Nm, although a larger or smaller hysteresis zone may also be used within the scope of the present invention.

Figure 4:
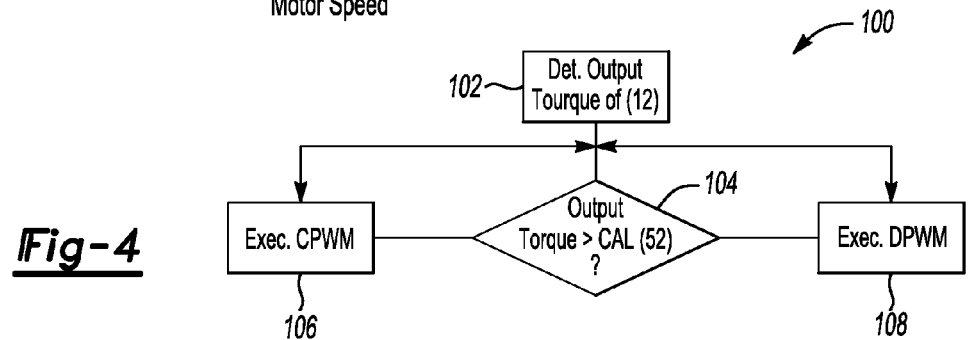
FIG. 4 is a flow chart describing a method for selecting between PWM signals during the control of a TPIM of the type shown in FIG. 2.

Referring to FIG. 4, one possible embodiment of the present method 100 is described with reference to the structure of FIG. 1. Beginning at step 102, the controller 40 determines the commanded motor output torque of the traction motor 12. Step 102 may include referencing the present transmission operating mode, and/or processing a driver's torque request such as an apply rate and/or travel of an accelerator pedal. Once the commanded motor output torque is known, the controller 40 proceeds to step 104.

At step 104, the controller 40 compares the commanded motor output torque from step 102 to the calibrated torque threshold (line 52), or alternatively to the hysteresis line 152 if such an embodiment is used. If the commanded motor output torque exceeds the calibrated torque threshold (line 52), the controller 40 proceeds to step 106. If the commanded motor output torque is less than the calibrated torque threshold (line 52), the controller 40 proceeds instead to step 108.

At step 106, the controller 40 automatically executes a predetermined CPWM technique as explained above. Step 106 includes transmitting, from the controller 40, the PWM signal (arrow 11) to the TPIM 24, with the PWM signal in this instance being a CPWM signal. The controller 40 then repeats step 104 to determine if CPWM is still required.

At step 108, the controller 40 automatically executes a predetermined DPWM technique as explained above. Step 108 includes transmitting, from the controller 40, the PWM signal (arrow 11) to the TPIM 24, with the PWM signal in this instance being a DPWM signal. The controller 40 repeats step 104 to determine if DPWM is still required. Thus, the selection of a PWM strategy is dependent on the commanded motor output torque or, in other embodiments, another predetermined vehicle operating condition of the electric drive system. The present approach may provide a balance between low distortion, torque ripple, and high efficiency.

While the best modes for carrying out the invention have been described in detail, those familiar with the art to which this invention relates will recognize various alternative designs and embodiments for practicing the invention within the scope of the appended claims.

The invention claimed is:

1. A method for controlling a traction power inverter module (TPIM) in a vehicle having the TPIM and a traction motor, the method comprising:
   comparing a commanded output torque of the traction motor to a calibrated threshold using a controller;
   selecting a discontinuous pulse width modulated (DPWM) signal when the commanded output torque is less than the calibrated threshold;
   selecting a continuous pulse width modulated (CPWM) signal when the commanded output torque is greater than the calibrated threshold; and
   transmitting the selected DPWM signal or CPWM signal from the TPIM to the traction motor to thereby control an operation of the traction motor.

2. The method of claim 1, wherein the traction motor is one of a permanent magnet motor and an alternating current (AC) induction-type motor.

3. The method of claim 1, further comprising:
   determining a direction of a change in the commanded output torque; and
   transitioning from the CPWM signal to the DPWM signal only when the commanded output torque drops below a predetermined hysteresis level.

4. The method of claim 3, wherein the predetermined hysteresis level is approximately 90% of the calibrated threshold.

5. The method of claim 1, wherein the CPWM signal is one of a sine PWM, a third harmonic injection PWM, and a classical space vector PWM.

6. The method of claim 1, wherein the traction motor is a three-phase AC electric machine and the TPIM includes three corresponding pairs of semiconductor switches, and wherein transmitting the selected DPWM signal or CPWM signal includes transmitting a separate PWM signal for each of the three pairs of semiconductor switches of the TPIM.

7. A vehicle comprising:
   a traction motor producing a motor output torque for propelling the vehicle;
   an energy storage system (ESS);
   a traction power inverter module (TPIM) electrically connected to the ESS and to the traction motor, wherein the TPIM is operable for converting DC power from the ESS into AC power for energizing the traction motor; and
   a controller configured to:
      determine a commanded output torque of the traction motor;
      control the TPIM and the traction motor using a discontinuous pulse width modulated (DPWM) signal when the commanded output torque is less than a calibrated torque threshold; and
      control the TPIM and the traction motor using a continuous pulse width modulated (CPWM) signal when the commanded output torque is greater than the calibrated torque threshold.

8. The vehicle of claim 7, wherein the traction motor is one of a permanent magnet motor and an alternating current (AC) induction-type motor.

9. The vehicle of claim 7, wherein the controller is further configured for:
   determining a direction of a change in the commanded output torque; and
   transitioning from the CPWM signal to the DPWM signal only when the commanded output torque drops below a predetermined hysteresis level.

10. The vehicle of claim 7, wherein the traction motor is a three-phase AC electric machine and the TPIM includes three corresponding pairs of semiconductor switches, and wherein the controller is configured for transmitting a separate PWM signal for each of the three pairs of semiconductor switches of the TPIM.

11. A method for controlling a traction power inverter module (TPIM) in a vehicle having the TPIM and a three-phase AC traction motor, the method comprising:
   comparing a commanded output torque of the traction motor to a calibrated threshold using a motor control processor;
   selecting a discontinuous pulse width modulated (DPWM) signal when the commanded output torque is less than the calibrated threshold;
   selecting a continuous pulse width modulated (CPWM) signal when the commanded output torque is greater than the calibrated threshold; and
   transmitting the selected DPWM signal or CPWM signal from the TPIM to the traction motor, including transmitting a separate DPWM or CPWM signal for each of three pairs of semiconductor switches of the TPIM.

12. The method of claim 11, further comprising:
   determining a direction of a change in the commanded output torque; and
   transitioning from the CPWM signal to the DPWM signal only when the commanded output torque drops below approximately 90% of the calibrated threshold.

13. The method of claim 11, wherein the CPWM signal is a sine PWM signal and the DPWM signal is a generalized DPWM (GPWM) signal.

* * * * *